United States Patent
DeSota et al.

(10) Patent No.: US 6,295,584 B1
(45) Date of Patent: *Sep. 25, 2001

(54) MULTIPROCESSOR COMPUTER SYSTEM WITH MEMORY MAP TRANSLATION

(75) Inventors: Donald R. DeSota, Portland; Bruce M. Gilbert, Beaverton; Thomas D. Lovett; Robert J. Safranek, both of Portland; Kenneth Frank Dove, Tigard, all of OR (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/920,673

(22) Filed: Aug. 29, 1997

(51) Int. Cl.$^7$ .................................................. G06F 12/00
(52) U.S. Cl. ........................... 711/147; 711/203; 711/209
(58) Field of Search .................... 711/118, 147, 711/203, 207, 208, 209, 205, 6, 202, 148

(56) References Cited

U.S. PATENT DOCUMENTS

| | | | |
|---|---|---|---|
| 5,117,350 | * | 5/1992 | Parrish et al. .......................... 711/202 |
| 5,303,362 | * | 4/1994 | Butts, Jr. et al. ...................... 711/121 |
| 5,404,489 | * | 4/1995 | Woods et al. .......................... 711/152 |
| 5,475,858 | * | 12/1995 | Gupta et al. ........................... 711/148 |
| 5,592,625 | * | 1/1997 | Sandberg ............................... 711/147 |
| 5,710,907 | * | 1/1998 | Hagersten et al. .................... 395/475 |
| 5,778,429 | * | 7/1998 | Sukegawa et al. ................... 711/153 |
| 5,778,437 | * | 7/1998 | Baylor et al. ......................... 711/154 |
| 5,784,706 | * | 7/1998 | Oberlin et al. ........................ 711/202 |
| 5,802,578 | * | 9/1998 | Lovett ................................... 711/147 |
| 5,860,146 | * | 1/1999 | Vishin et al. .......................... 711/207 |
| 5,897,657 | * | 4/1999 | Hagersten et al. .................... 711/145 |
| 5,918,229 | * | 6/1999 | Davis et al. ............................ 707/10 |
| 5,933,857 | * | 8/1999 | Br ........................................ 711/202 |
| 5,938,765 | * | 8/1999 | Dove et al. ............................... 713/2 |
| 5,987,506 | * | 11/1999 | Carter et al. .......................... 709/213 |
| 6,055,617 | * | 4/2000 | Kingsbury ............................. 711/203 |

OTHER PUBLICATIONS

"PCI Configuration Space," Peripheral Component Interconnect (PCI), Intel Corporation, chapter 5, pp. 75–84 (1992).

"Input–Output Organization," Computer Organization (second edition), by V. Carl Hamacher, Zvonko G. Vranesic, and Safwat G. Zaky, University of Toronto, chapter 6, pp. 173–175 (1984).

"Detailed Functional Description," Symmetry Multiprocessor Architecture Overview, Sequent Computer Systems, Inc., chapter 3, pp. 1–39 (1994).

A Reference for Designing Servers and Peripherals for the Microsoft windows NT Server Operating Systems, Hardware Dsign Guide For Windows NT Servers, Intel Corp. and Microsoft Corp. (1997–1998).*

* cited by examiner

Primary Examiner—Matthew Kim
Assistant Examiner—Pierre-Michel Bataille
(74) Attorney, Agent, or Firm—Klarquist Sparkman Campbell Leigh and Whinston LLP

(57) ABSTRACT

An apparatus and method is disclosed for allowing a multiprocessor computer system with shared memory distributed among multiple nodes to appear like a single-node environment. The single-node environment is implemented with a memory map that has a unique address for every memory location in the system. Overlapping address spaces in the multinode environment are also assigned unique representative addresses that are translated to actual addresses in conformance with the multinode environment. The apparatus and method allows a wide variety of operating systems to be run on the multinode environment. Additionally, industry standard BIOS and chip sets can be used.

14 Claims, 9 Drawing Sheets

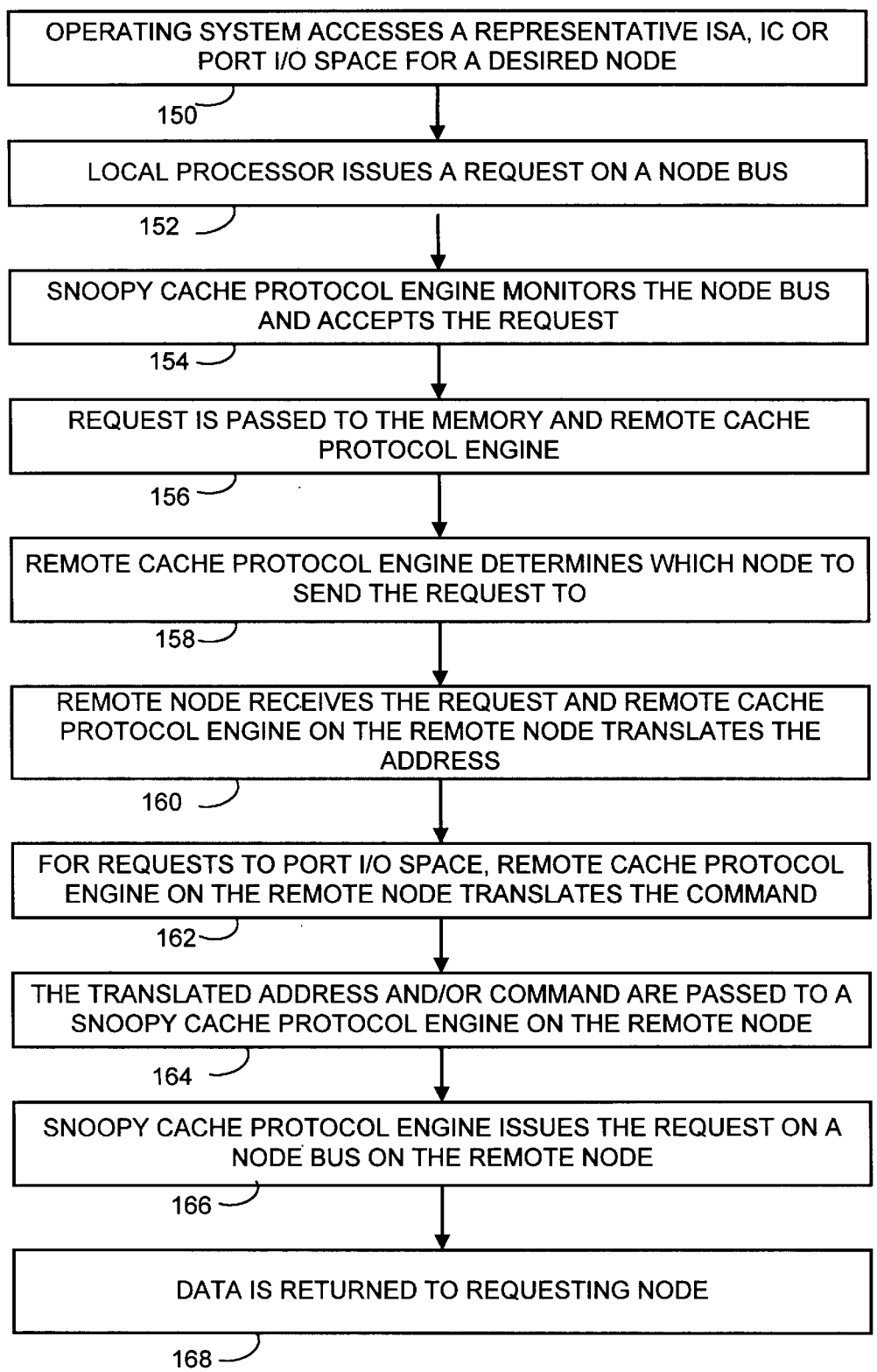

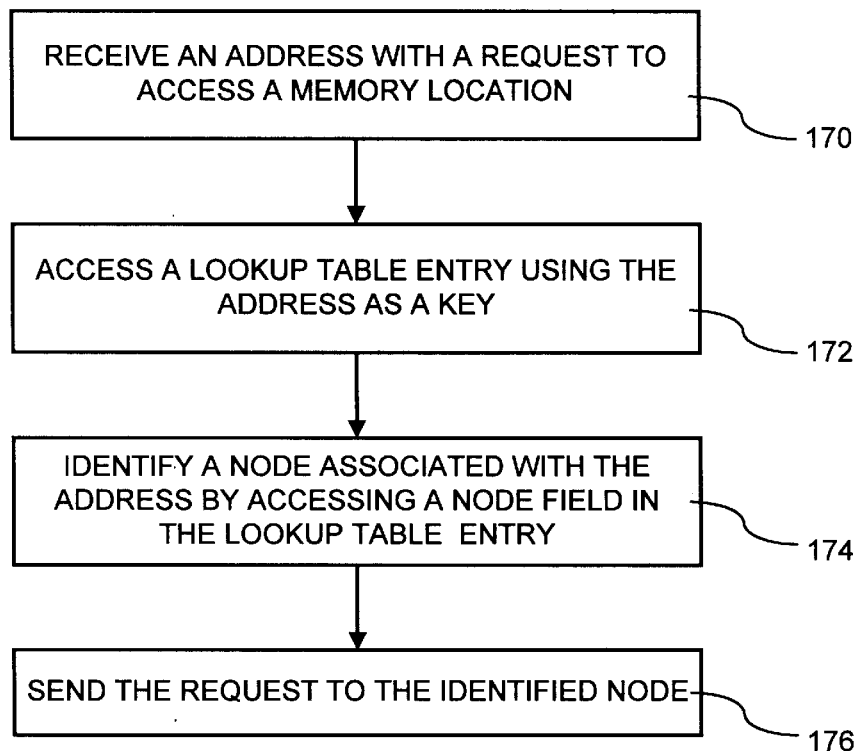

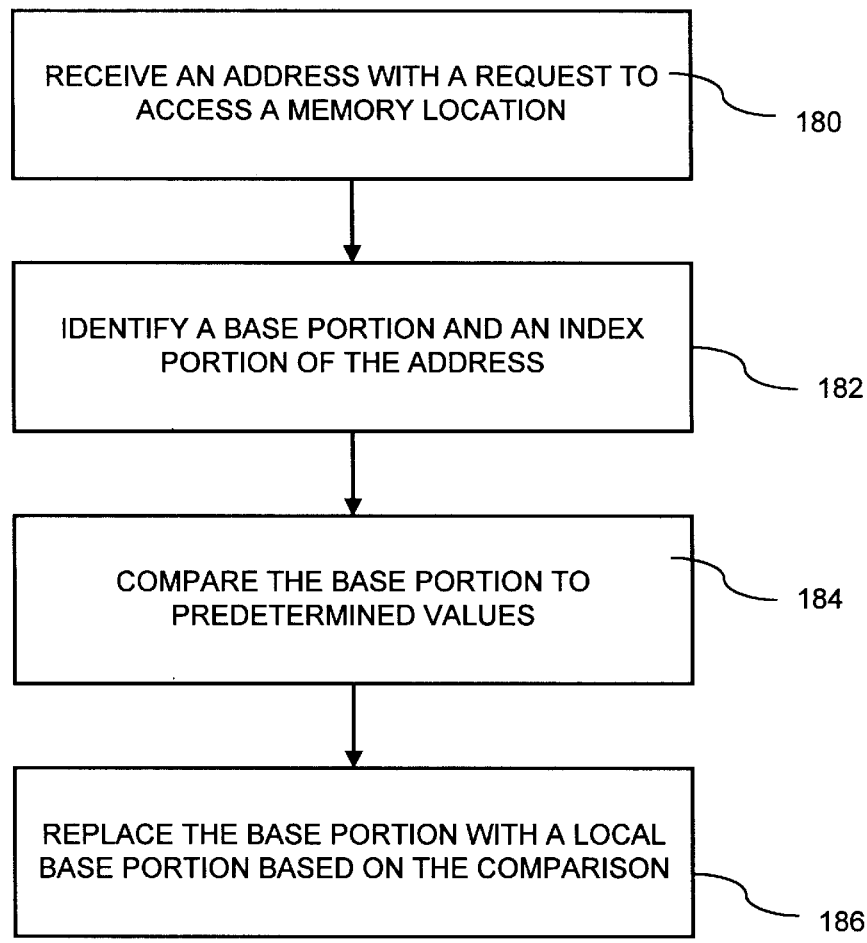
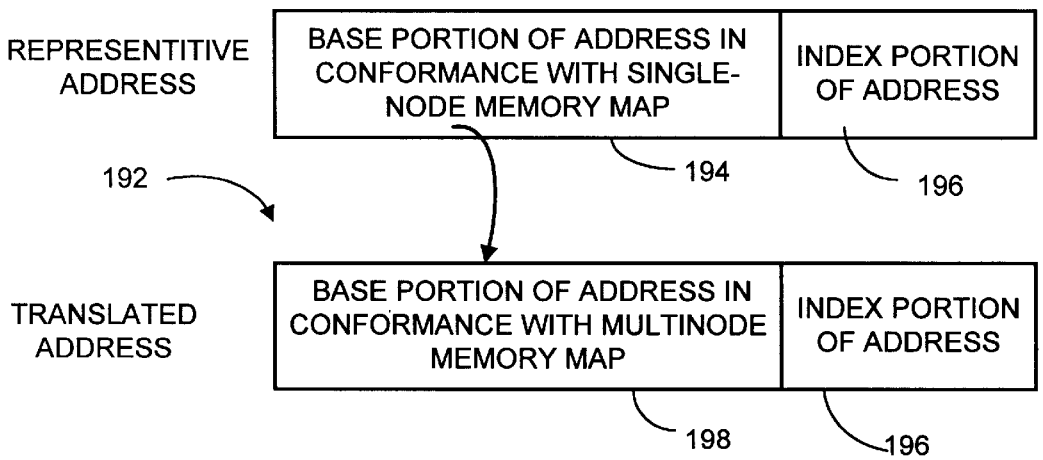

MULTIPROCESSOR COMPUTER SYSTEM WITH MEMORY MAP TRANSLATION

FIELD OF THE INVENTION

This invention relates generally to a computer system with multiple processors located on a plurality of nodes. More particularly, this invention relates to using memory map translation to uniquely address memory space on such a multiprocessor computer system.

BACKGROUND OF THE INVENTION

Multiprocessor computers by definition contain multiple processors that can execute multiple parts of a computer program or multiple programs simultaneously. In general, this parallel computer executes computer programs faster than conventional single processor computers, such as personal computers (PCs), that execute the parts of a program sequentially. The actual performance advantage is a function of a number of factors, including the degree to which parts of a program can be executed in parallel and the architecture of the particular multiprocessor computer at hand.

Multiprocessor computers may be classified by how they share information among the processors. Shared-memory multiprocessor computers offer a common physical memory address space that all processors can access. Processes within a program communicate through shared variables in memory that allow them to read or write to the same memory location in the computer. Message passing multiprocessor computers, on the other hand, have a separate memory space for each processor. Processes communicate through messages to each other.

Multiprocessor computers may also be classified by how the memory is physically organized. In distributed shared-memory computers, the memory is divided into modules physically placed near each processor. Although all of the memory modules are globally accessible, a processor can access memory placed nearby faster than memory placed remotely. Because the memory access time differs based on memory location, distributed shared-memory systems are often called non-uniform memory access (NUMA) machines. By contrast, in centralized shared-memory computers, the memory is physically in just one location. Such centralized shared-memory computers are called uniform memory access (UMA) machines because the memory is equidistant in time and space from each of the processors. Both forms of memory organization typically use high-speed cache memory in conjunction with main memory to reduce execution time.

Multiprocessor computers with distributed shared memory are often organized into multiple nodes with one or more processors per node. The nodes interface with each other through a network by using a protocol, such as the protocol described in the Scalable Coherent Interface (SCI) (IEEE 1596). Companies, like Intel Corporation, have developed "chip sets" which may be located on each node to provide memory and I/O buses for the multiprocessor computers.

Such chip sets often have predetermined memory addresses for basic input/output systems (BIOS), interrupts, etc. For example, a chip set following an Industry Standard Architecture (ISA) has memory addresses dedicated to particular functions, such as system BIOS, video BIOS, graphics adapters, expansion memory, etc. This memory area, often called the ISA space, extends between addresses 640 KB to 1 MB for typical PC-based environments. A chip set may also include an interrupt controller that has a fixed range of addresses. An example of an interrupt controller is the Advanced Programmable Interrupt Controller (APIC) developed by Intel Corporation. The interrupt controller also has a fixed range of memory addresses, often called interrupt controller (IC) space.

In a multinode computer system, each node contains its own chip set to interface with its local bus. Consequently, memory addresses between nodes overlap with each other. For example, two or more nodes may have their own ISA space addressed between 640 KB to 1 MB. By contrast, single-node computer systems only have one chip set and each memory address in the system is unique.

Typically, in either the single-node or multinode computer system, a single operating system controls the computer system (some systems may contain more than one operating system). The operating system includes a program (often called a kernel) that performs a number of tasks central to the computer's operation including managing memory, files and peripheral devices, launching application programs, and allocating system resources.

Recently developed operating systems (e.g., Windows NT) are designed for single-node multiprocessor environments and expect each memory address in the system to be unique. For this reason, such operating systems cannot run on a multinode computer system where memory addresses between nodes overlap due to the requirements of the chip sets. For example, in a multinode environment, a processor on one node cannot access ISA space on another node without a mechanism designed to allow for this.

An objective of the invention, therefore, is to provide a shared-memory, multinode computer system utilizing chip sets developed for single-node computer systems. A further objective is to provide such a system that allows an operating system to access all system resources from any processor within the system. Still a further objective is to provide such a system that can use the well-established PC-based BIOS for initialization.

SUMMARY OF THE INVENTION

The present invention provides a multiprocessor computer system with a distributed shared memory that has the advantages of a multinode environment (e.g., increased speed and reduced local bus traffic), but with the characteristics of a single-node environment. Thus, operating systems designed for single-node environments can be used to run the multinode environment. The invention also takes advantage of standard hardware and software used in the well-developed, PC-based computers, such as commercially used chip sets and BIOS.

In one aspect of the invention, a memory map having the appearance of a single-node environment is used to uniquely identify the memory locations in the computer system. For memory locations that have overlapping addresses between nodes, the memory locations are assigned representative address locations. When an operating system or other program accesses a representative address, the computer system ascertains or determines which node is associated with the request and sends the request to that node. The address sent with the request is then translated to a local address for that node. Thus, overlapping address spaces on nodes can be uniquely identified and accessed.

In another aspect of the invention, the request itself is translated. A predetermined range of addresses are associated with an input/output (I/O) space for communicating with peripheral devices. When accessing this I/O space, the commands used are different than commands used for accessing other address spaces on the system. In order to maintain the appearance of a single-node environment, an operating system may request access to all memory locations using the same set of commands. But when accessing the I/O space, the commands are translated to appropriate commands needed for the I/O space in conformance with the multinode environment.

The foregoing and other objects, features, and advantages of the invention will become more apparent from the following detailed description of a preferred embodiment which proceeds with reference to the following drawings.

BRIEF DESCRIPTION OF THE DRAWINGS

FIG. 7 is a detailed flow chart of a method for accessing a memory location at a desired address using the memory map of FIG. 6.

FIG. 8A is a flow chart of a method for identifying a node associated with an address within the memory map of FIG. 6.

FIG. 8B is a lookup table used by the method of FIG. 8A.

FIG. 9A is a flow chart of a method for translating a representative address from the memory map of FIG. 6 to an actual address in the multinode computer system.

FIG. 9B shows a representative address translated to an actual address in conformance with FIG. 9A.

DETAILED DESCRIPTION OF A PREFERRED EMBODIMENT

System Overview

Figure 1:
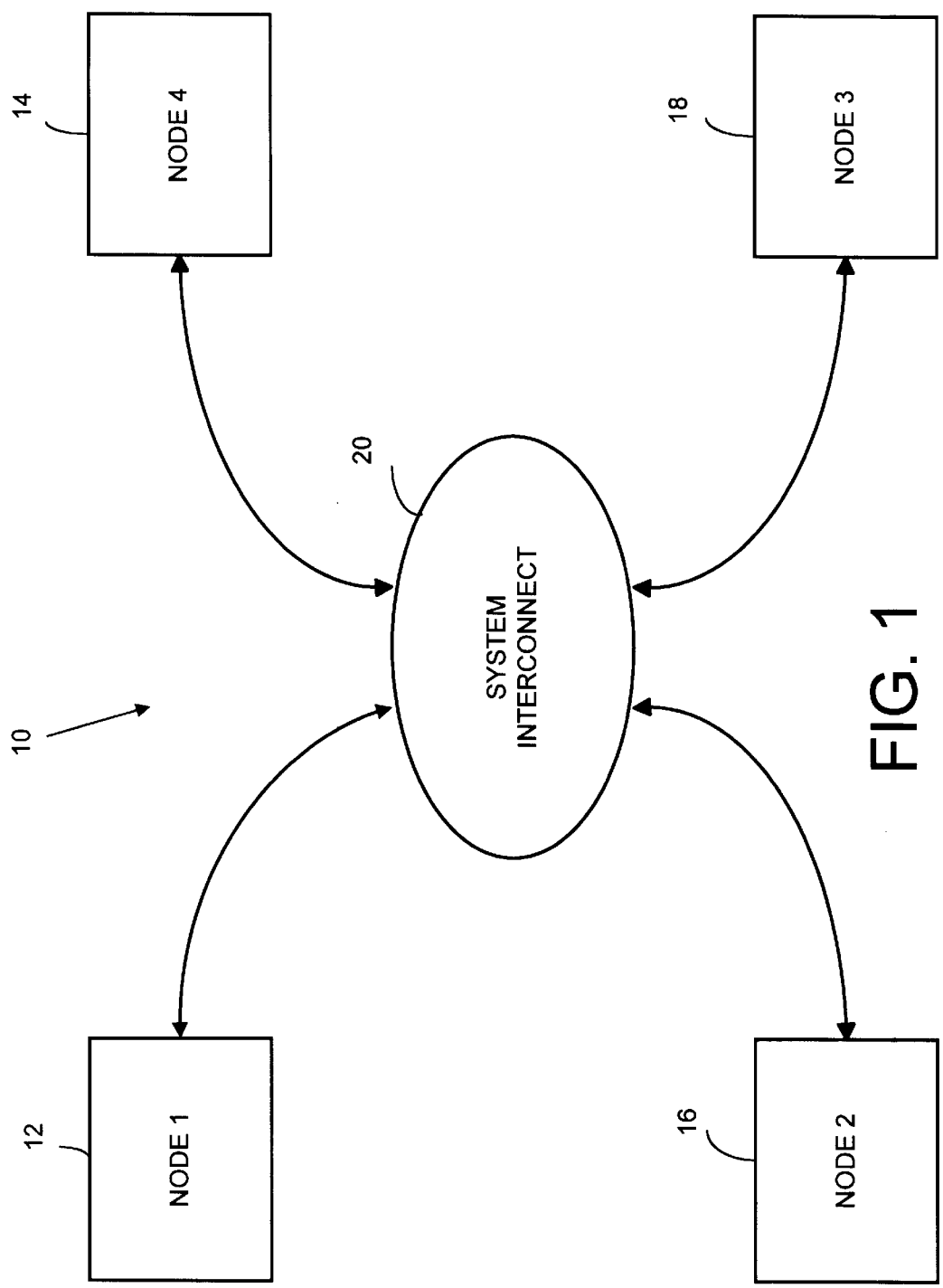
FIG. 1 is a block diagram of a multinode, multiprocessor computer system with a system interconnect coupling the nodes together in accordance with the invention.

FIG. 1 is a block diagram of a multinode, multiprocessor computer system 10 in accordance with the invention. System 10 uses a computer architecture based on Distributed-Shared Memory (DSM). Four nodes 12–18 are shown connected by a system interconnect 20 (i.e., a network) that permits any node to communicate with any other node. Specifically, the purpose of system interconnect 20 is to allow processors in any node to access the memory resident in any other node with cache coherency guaranteed and to provide processors access to system resources on other nodes. System interconnect 20 is a switch-based network that uses the Scalable Coherent Interface (SCI) interconnection mechanism. SCI is an IEEE-approved standard, or protocol (1596), well documented in a number of publications including *IEEE Std* 1596-1992 (Aug. 2, 1993) and *Multiprocessor Interconnection Using SCI*, a Master Thesis by Ivan Tving, DTH ID-E 579 (1994), both of which are hereby incorporated by reference.

The physical links of interconnect 20 provide high bandwidth and low latency and are scalable to allow for the addition of more nodes. Links that meet these requirements include point-to-point interconnects with a data throughput of one gigabyte/second or greater. The links can be configured in any number of suitable ways for connecting nodes 12–18, such as in a ring topology, in arbitrary topologies through switches, or in a combination of both. The links can be wired or wireless (optical, RF, etc.) depending upon system performance needs. Additional topologies are described in "Interconnect Topologies with Point-To-Point Rings," Ross E. Johnson and James E. Goodman. December 1991, Computer Sciences Technical Report #1058, University of Wisconsin-Madison.

Node Overview

Figure 2:
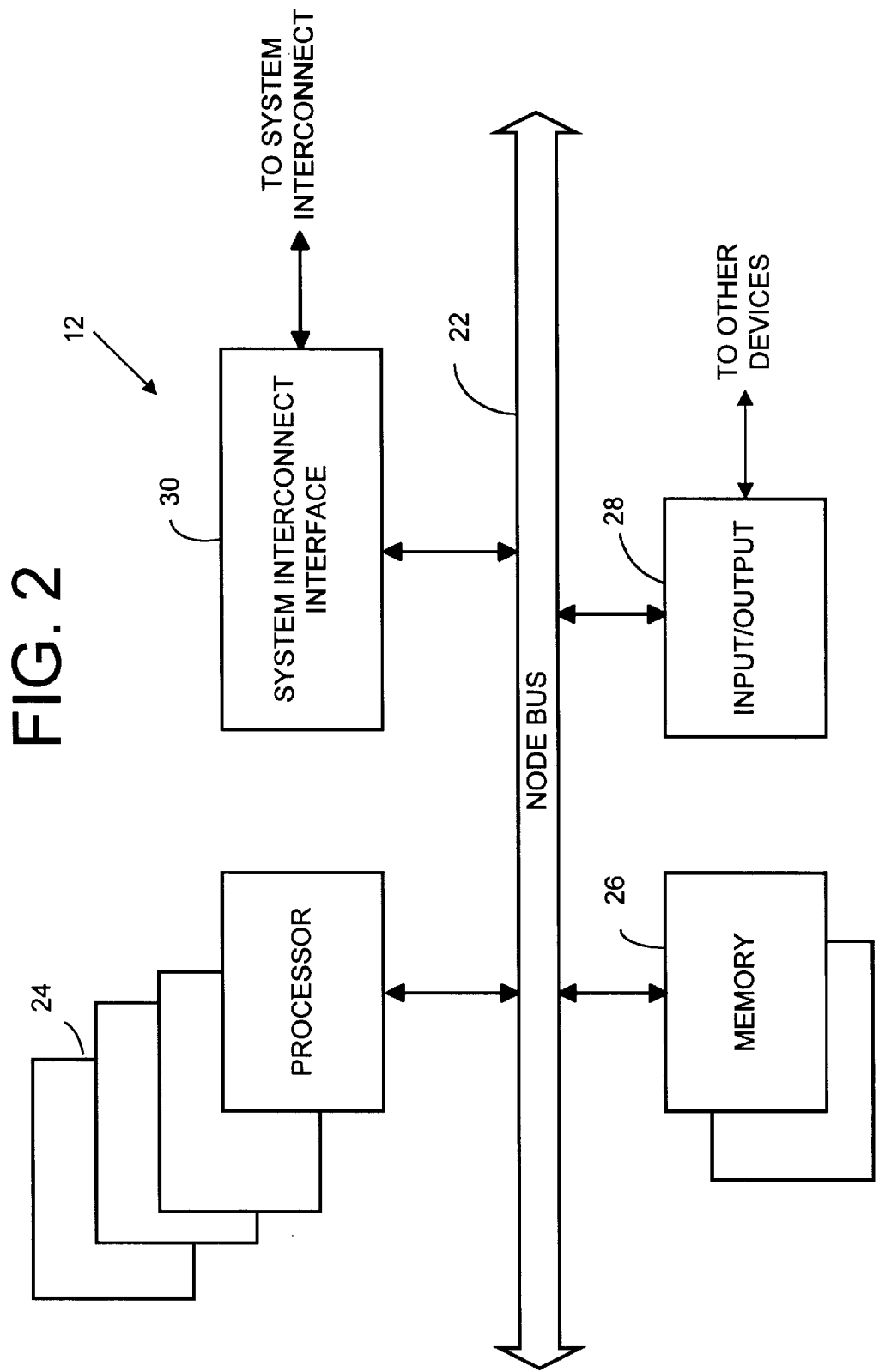
FIG. 2 is a block diagram of one of the nodes of the computer system of FIG. 1.

A block diagram of node 12 of system 10 is shown in FIG. 2. The node includes a conventional symmetrical multiprocessor (SMP) node bus 22 (e.g., a P6 bus) for connecting multiple data processors 24 to local memory 26. The processors are Pentium® Pro processors but other processors can be used. For clarity, nodes 12–18 may be referred to as home nodes or remote nodes in certain circumstances. A home node is one whose local memory stores a memory block of interest (i.e., the address of the memory block falls within the address range supported by the local memory or cache); all of the other nodes are then remote nodes with respect to that memory block. Additionally, a node may be a requesting node or a responding node. A requesting node is one requesting data; a responding node is one furnishing such data. Input/output (I/O) 28, which is also connected to bus 22, connects the node to devices outside computer system 10 for communicating information between the computer system and the outside world. I/O may be of conventional design and includes means for connecting the node (and hence system 10) to personal computers, local area networks, etc., that wish to utilize the power of the multinode computer system. I/O 28 and memory 26 may be coupled to the node bus 22 by using standard chip sets (not shown), such as the 82450gx PCI chip set developed by Intel Corporation. The 82450 chip set provides a bridge to one or more PCI buses (not shown) and memory 26.

To connect node 12 to the other nodes in the system, the node includes a system interconnect interface 30. The system interconnect interface 30 forms part of interconnect 20 along with the physical links between nodes and the same devices on the other nodes of the computer system 10. In the present embodiment, interface 30 is constructed to implement the SCI standard for data communication between the nodes, allowing a processor on one node to access data stored on another node. The interface 30 also contains a remote cache in the present embodiment, although this combination is not required for the invention.

System Interconnect Interface Overview

Figure 3:
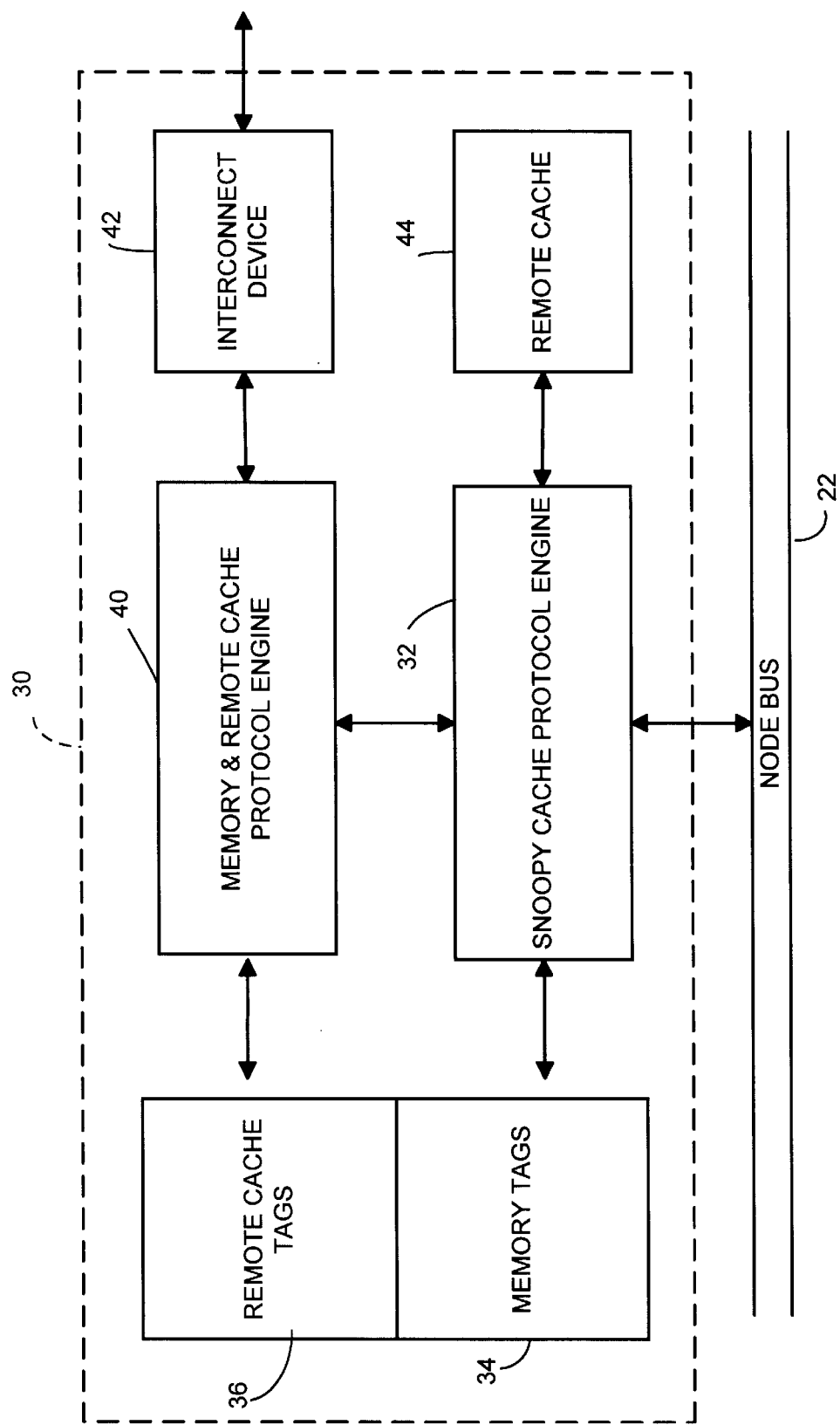
FIG. 3 is a block diagram of a system interconnect interface within the node of FIG. 2.

FIG. 3 is a block diagram showing the system interconnect interface 30 in more detail. System interconnect interface 30 interfaces the caches and memory on local node bus 22 with caches and memories on remote nodes. A directory-based cache protocol based on SCI is used to manage the coherency of the local and remote caches. Interface 30 includes a snoopy cache protocol engine 32, storage for memory tags and remote cache tags 34 and 36, a memory and remote cache protocol engine 40, an interconnect device 42, and a remote cache 44.

Snoopy cache protocol engine 32 provides an interface to node bus 22 by monitoring (also called "snooping") node bus 22 to see if there are any requests on the bus that protocol engine 32 needs to act on or respond to.

Memory and remote cache protocol engine 40 manages the SCI protocol and may include one or more protocol engines. The protocol engine is a three-stage pipelined processor, but other types of protocol engines may be used.

Interconnect device 42 (also called a "data pump") provides a link and packet level interface to the SCI ring. The interconnect device puts SCI packets onto system interconnect 20, bypasses SCI packets targeted for other nodes, and strips SCI packets from the system interconnect that are targeted for the node that interconnect device 42 is located on. Interconnect device 42 is a chip developed by Vitesse Semiconductor Corporation, but other interconnect devices may be used.

Remote cache 44 is used to store copies of memory lines fetched from remote memories on other nodes. Remote cache is 32 Mbytes and is organized as a four-way associative cache with 64 byte lines. However, the type, size and organization of remote cache 44 can be modified based on the particular application and need not be present in the present embodiment.

Memory Map Problems on the Computer System

A memory map is a representation of where resources are available on computer system 10. The term "memory map" is a standard term used in the art. A memory map includes addresses of memory and other devices on the system, such as I/O devices, control registers, etc. The term "memory location" is used to refer to addresses in the memory map. Consequently, a memory location refers to an actual memory location, control registers, etc. A memory location is said to be "accessed" when a read, write or other operation is performed on the memory location.

In a multinode system, some or all of the nodes contain addresses that overlap with other nodes in the system making it difficult to differentiate or uniquely address any one location. Thus, providing a single memory map that uniquely identifies each address in the system is impossible unless node identifiers are included in the address. But including node identifiers is not feasible for many of the currently used operating systems because such operating systems are developed for single-node environments and for the address space available with existing processors.

Figure 4:
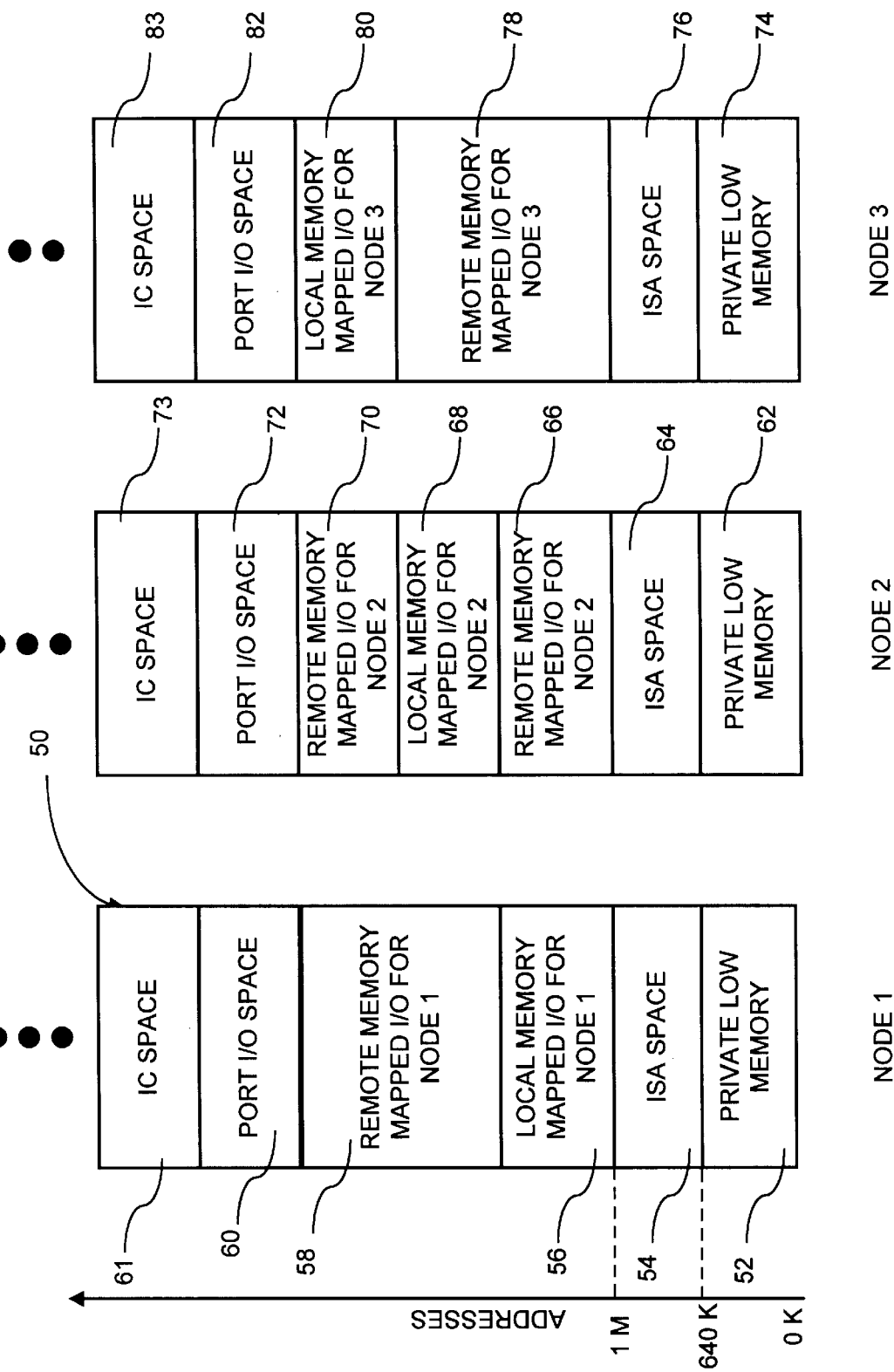
FIG. 4 is a memory map for a multiple-node environment on the computer system of FIG. 1.

FIG. 4 shows a memory map 50 for some of the nodes on the multinode computer system 10. Node 1 includes a private low memory area 52, ISA space 54, local memory mapped I/O 56, remote memory mapped I/O 58, port I/O space 60 and interrupt controller (IC) space 61. Those skilled in the art will recognize that memory maps vary between designs and the invention should not be limited to any particular memory map. For example, depending on the application, some or all of these address spaces may be moved or eliminated. Additionally, other address spaces may be added.

Comparing node 1 to the other nodes, private low memory ISA space 54 on node 1 overlaps (has the same memory addresses) with ISA space 64 on node 2 and ISA space 76 on node 3. The same is true for port I/O space 60, 72 and 82 and IC space 61, 73, 83.

Local memory mapped I/O 56 and remote memory mapped I/O 58 on node 1 are examples of areas that do not have overlapping addresses between nodes. For example, local memory mapped I/O 56 for node 1 can be accessed by node 2 or node 3. Node 2 sees this address area as remote memory mapped I/O 66. Similarly, node 3 sees this address space as within remote memory mapped I/O 78. Likewise, local memory mapped I/O 68 for node 2 appears as remote memory 58 to node 1 and remote memory 78 to node 3. Node 3 also contains a local memory area 80 that is seen as remote memory 58 and 70 for nodes 1 and 2, respectively.

For areas where addresses do not overlap, each node can access the data on the other nodes. But for overlapping addresses, the data on a remote node is not accessible. For example, node 1 can access its own ISA space 54 by using an address between 640 KB and 1 MB. But there is no way for node 1 to access ISA space 64 on node 2.

Overview of Memory Mapping for a Multinode Environment

Figure 5:
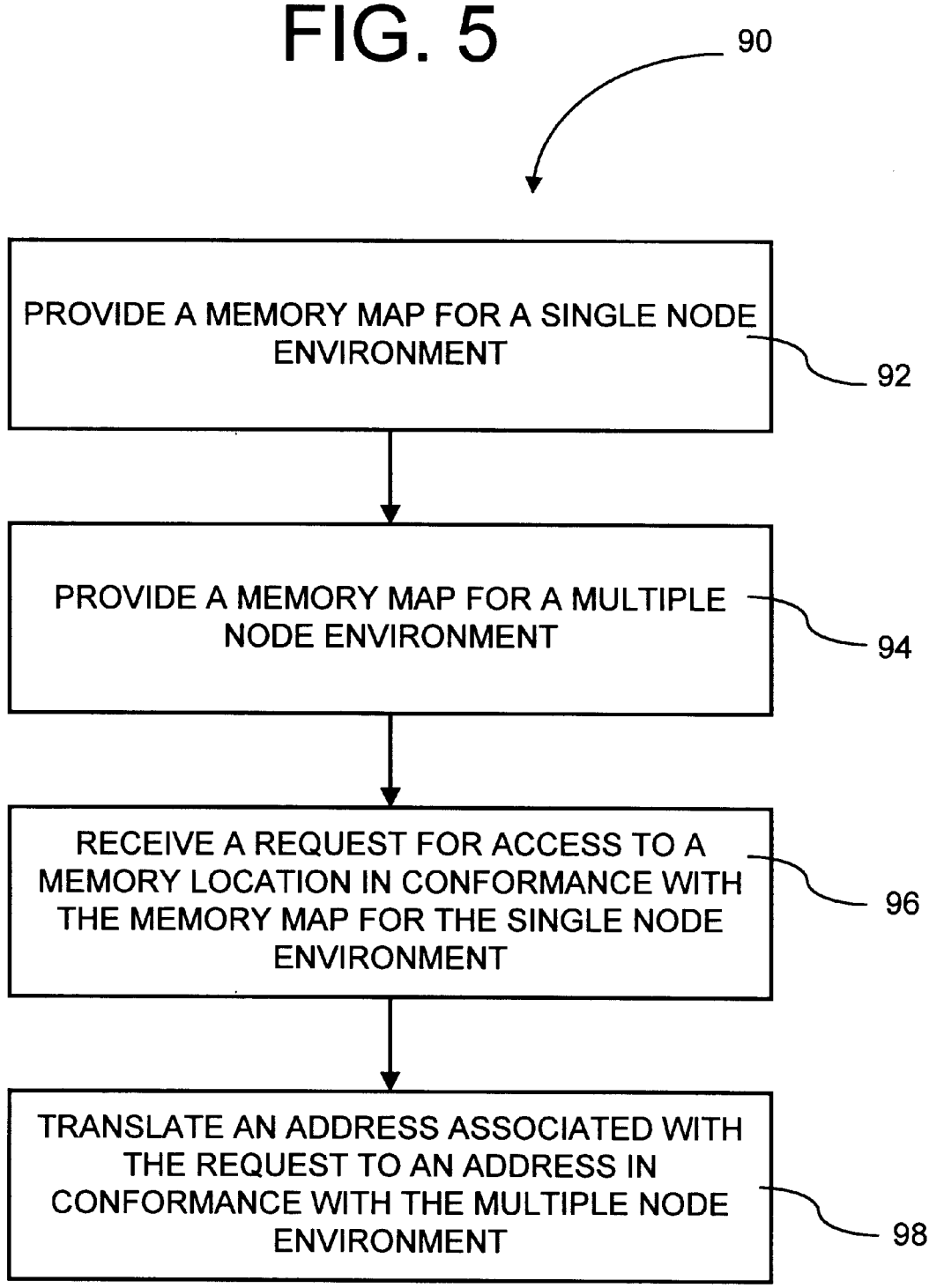
FIG. 5 is a flow chart of a method for accessing a memory location within the computer system of FIG. 1 in accordance with the invention.

FIG. 5 shows a flow chart 90 of a method for memory mapping a multinode environment so that substantially all addresses are accessible to processors in the system regardless of whether addresses are overlapping. The memory mapping makes the multinode environment appear like a single-node environment so that a wide range of operating systems can be used. Step 92 shows that a memory map for a single-node environment is provided to the operating system. This memory map (shown in FIG. 6 and described further below) uniquely identifies all addresses in the multinode environment. For overlapping address areas in the multinode environment, the memory map assigns unique representative addresses to each overlapping address. These representative addresses are not actual addresses used in the multinode environment. For example, if nodes 1 and 2 both have an overlapping address A, the single-node memory map assigns two separate addresses, B and C, to uniquely identify address A on both nodes. For non-overlapping address areas, the actual addresses for the multinode environment are used. Thus, for example if node 1 has an address D that does not overlap with an address on any other node, than the single-node memory map uses address D. Thus, in the memory map for the single-node environment, each overlapping memory area is assigned a unique. representative address.

In step 94, the system includes a memory map for the multinode environment. As explained in regard to FIG. 4, in the multinode environment, some actual addresses overlap, while others do not. The multinode memory map differs from the single-node memory map in that the multinode memory map does not include representative addresses.

In step 96, an operating system or user program requests access to a memory location in conformance with the memory map for the single-node environment. The request includes a unique address for the memory location.

Step 98 shows that the unique address is translated to an address that conforms with the multiple-node environment. In the case of a non-overlapping address, the address does not require translation. However, in the case of overlapping addresses, the unique, representative address from the single-node environment is translated to an actual address by determining a node that the address corresponds to and changing the representative address to an actual address for that node. Continuing with the above example, if address B is accessed, it is sent to node 1 and translated to address A on that node. Similarly, if address C is accessed, it is sent to node 2 and translated to address A on that node.

Improved Memory Map

Figure 6:
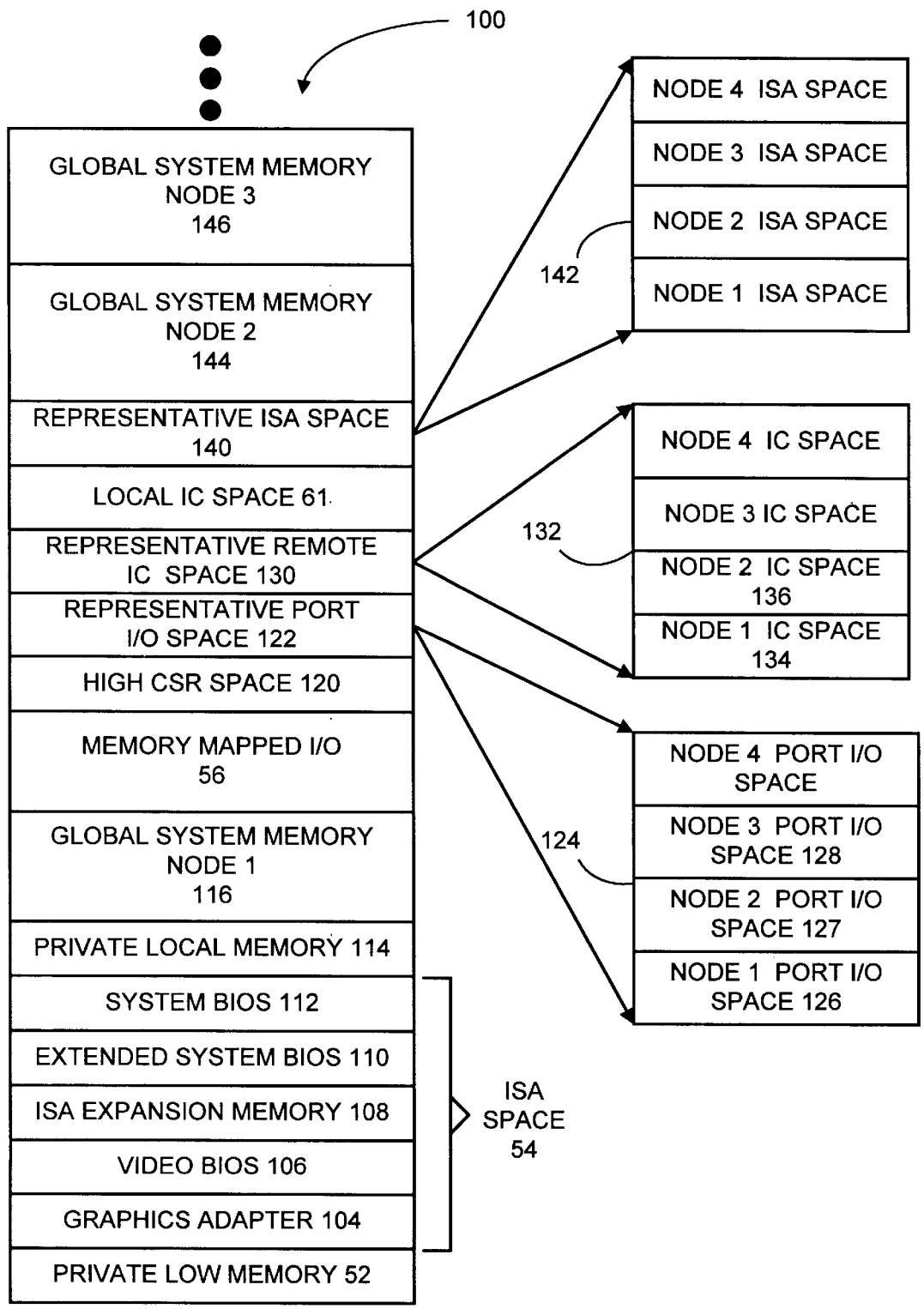
FIG. 6 is a memory map having representative addresses for allowing the multinode computer system of FIG. 1 to appear like a single-node environment.

FIG. 6 shows a memory map 100 for node 1 that makes the multinode environment appear like a single-node environment and allows processors on any node to access system resources on other nodes, even for overlapping addresses. Other nodes have similar memory maps. The lowest memory address area is a private low memory 52. The addresses between 640KB to 1MB of memory is dedicated to ISA space 54, which includes a graphics adapter 104, a video BIOS 106, an ISA expansion memory 108, extended system BIOS 110, and a system BIOS 112. The ISA space overlaps with addresses on other nodes in system 10, as shown in FIG. 4 (address spaces 54, 64 and 76). Memory map 100 also includes other areas (some of which were not shown in FIG. 4 for simplicity) such as, a private local memory 114, a global system memory 116 for node 1, a memory map I/O region 56, and a high CSR space 120. Memory areas 114, 116, 56, and 120 include addresses that do not overlap with addresses on other nodes.

A representative port I/O space 122 represents overlapping addresses in the multinode environment. As those skilled in the art will recognize, port I/O space is used to identify registers on controllers typically used in the initialization of I/O adapters. A window 124 shows in greater detail representative port I/O space 122. This space is divided into 4 areas, one for each node in the system. Although each of these nodes has overlapping addresses for their port I/O space, the single-node memory map represents them individually and uniquely as different addresses. These, however, are not the actual addresses for the port I/O space. But by uniquely representing each port I/O address on the nodes, the single-node environment is maintained. As described in relation to step 98 in FIG. 5, the addresses in window 124 are only representative addresses and must be translated to the actual address for each node. Thus, if a request from a requesting node is made to access node 1's representative port I/O space using an address within an address space 126, that request is sent to node 1 and translated to node 1's port I/O space 60 according to the multinode environment. Similarly, a request to access an address within address space 128 is sent to node 3 and translated to port I/O space 82 for that node.

Representative remote IC space 130 is another address range that includes representative addresses of overlapping memory locations. Like the representative port I/O space 122, IC space 130 includes unique addresses (see window 132) for 4 different nodes. For example, requesting access to representative address space 136 causes system 10 to send the request to node 1 and the address associated with the request is translated to an actual address in IC space 61 (FIG. 4). Similarly, accessing address space 136 causes the system to translate the request to IC space 73 (FIG. 4) on node 2. Local IC space 61 is the actual address range for IC space. Thus, a processor on node 1 can access IC space by using an address of the actual IC space 61, or by using the representative address 134 for node 1.

Representative ISA space 140 represents the actual ISA space on each node, as indicated in a detailed window 142. Using this representative address space, each node can access another node's actual ISA space. Similar to representative IC space 130 and local IC space 61, a node can access its own ISA space in two ways. For example, node 1 can access ISA space 54 by using the appropriate representative address within address range 140, or it can access ISA space directly by addressing within region 54. Remote nodes, however, can only access ISA space using the representative addresses 140.

A global system memory for node 2 is shown by an address space 144. Using this address range, node 1 or any other node can access global system memory for node 2. Each node has its own global system memory. For example, node 3 also has global system memory indicated by an address space 146.

Memory map 100 of FIG. 6 is organized for a particular implementation. The memory organization can be changed based on the application and is of no particular importance to the invention.

Detailed Flow Chart of Memory Map Translation

FIG. 7 is a flow chart of a method showing how the system hardware shown in FIGS. 1–3 translates representative addresses to actual addresses. Step 150 shows that an operating system running on the multinode computer system 10 accesses memory addresses in ISA, IC or port I/O space. For purposes of illustration, assume a processor on node 1 accesses IC space 73 on node 2 (FIG. 4) by using representative addresses 136 (FIG. 6).

In step 152, local processor 24 issues a request on node bus 22. The request includes a representative address 136 for the IC space. as described above.

In step 154, snoopy cache protocol engine 32 monitors node bus 22 for addresses within a predetermined range. For requests including representative addresses, snoopy cache protocol engine 32 accepts the requests.

In step 156, the request is passed from snoopy cache protocol engine 32 to memory and remote cache protocol engine 40.

In step 158, remote cache protocol engine 40 determines which node contains the address in the request. After this determination is made, the remote cache protocol engine sends the request through interconnect device 42 to that node. In the current example, the request is sent to node 2. Further details of how remote cache protocol engine 40 determines the node associated with the address are described below with reference to FIGS. 8A and 8B.

In step 160, the remote node receives the request through its interconnect device and passes the request to its memory and remote cache protocol engine on the remote node. The protocol engine on the remote node then translates the address to the actual address for that remote node. In the current example, the request to access IC space 136 causes a translation to IC space 73 on node 2. Further details on the method for translation are described below with reference to FIGS. 9A and 9B.

In step 162, the memory and remote cache protocol engine on the remote node determines whether the request is for port I/O space. If it is, the remote cache protocol engine must also translate the command associated with the request to a command needed to access port I/O space. Port I/O space typically has a different set of commands than other address spaces in the system. The different command is used to distinguish requests to port I/O space from other requests having the same memory address.

In step 164, the translated address and/or command is passed to the snoopy cache protocol engine on the remote node.

In step 166, the snoopy cache protocol engine on the remote node issues the request having the actual memory address onto its local node bus. At this point, the devices such as memory or other control devices on the node bus respond to the command for addresses within their range. In the current example, the interrupt controller (not shown) on node 2 accepts the request.

In step 168, in the case of a read, data is returned to the requesting node. That is, the memory or device on the remote node that is assigned to the requested address passes the data onto the node bus, it is received by the snoopy cache protocol engine, and passed by way of the memory and remote cache protocol engine and the interconnect device over the SCI network to the requesting node. In the current example, the interrupt controller on node 2 sends the desired data back to node 1.

Node Identification

FIG. 8A is a flow chart of a method showing how remote cache protocol engine 40 determines which node to send the request to in conformance with step 158 of FIG. 7. In step 170, memory and remote cache protocol engine 40 on the requesting node receives an address with the request passed from snoopy cache protocol engine 32.

In step 172, the memory and remote cache protocol engine accesses a lookup table or database entry using the address as a key. Each address in the representative region has a lookup table entry associated with it so that the memory and remote cache protocol engine can associate a node with a representative address.

Briefly, turning to FIG. 8B, a portion of a lookup table 178 is shown. Lookup table 178 includes a number of entries formed in rows. Each lookup table entry includes a representative address used as a key to access one of the lookup table entries. A node field within each lookup table entry identifies a node associated with the representative address. Additional fields may be used in the lookup table entries.

Returning to FIG. 8A, in step 174, memory and remote cache protocol engine 40 accesses a node field within the lookup table entry. Thus, a node associated with the representative address is identified.

In step 176, the node identified in step 174 is used to send the request through the interconnect device 42 to the identified node.

Address Translation

FIG. 9A shows a flow chart of a method for translating the representative address in conformance with step 160 of FIG. 7. In step 180, an address is received by memory and remote cache protocol engine 40 on the remote node. In step 182, the memory and remote cache protocol engine identifies an index portion and a base portion of the address. In step 184, the base portion is compared to predetermined values. In this step, the remote cache protocol engine determines whether the address corresponds to ISA space, IC space, or port I/O space. This may be accomplished through commands similar to a case statement or through if-then-else statements used in many programming languages. Other techniques for making a comparison are well-known in the art, such as using databases. Alternatively, this can be done through comparison logic in hardware. In any event, the comparison is used to determine the actual address space on the node corresponding to the representative address.

In step 186, the base portion needed to access the actual memory address on the node replaces the original base portion included in the representative address. Thus, the address is translated to the actual address on the node.

FIG. 9B shows a representative address 190 and a translated address 192. Representative address 190 includes a base portion 194 and an index portion 196. Base portion 194 is translated to a base portion 198 in translated address 192. Index portion 196 remains unchanged.

Command Translation

Command translation is accomplished substantially the same way as the address translation described in relation to FIG. 9A. A command associated with the request is received by memory and remote cache protocol engine 40 on the remote node. This command is suitable for accessing other memory locations in the system, but not port I/O space, which uses a different command set.

If the remote cache protocol engine determines that the address corresponds to port I/O space, the address is changed as described in FIGS. 9A and 9B, and the associated command is changed as well, using similar techniques. The translated command can then be used to access the proper port I/O space.

Having illustrated and described the principles of the invention in a preferred embodiment, it should be apparent to those skilled in the art that the embodiment can be modified in arrangement and detail without departing from such principles.

Although particular techniques are shown for translating addresses and determining nodes associated with those addresses, one skilled in the art will recognize that there are a wide variety of techniques in hardware and software for performing this methods. The invention should not be limited to any one technique.

Furthermore, although the invention is described in terms of particular hardware and software used, the hardware can be replaced by software and vice versa.

Although four nodes are shown, the invention is applicable to systems including any number of nodes in a multinode system.

Still further, although the remote protocol engine 40 is described as performing the address translation, this can be achieved by the requesting node. Additionally, other hardware or software can perform the address translation.

In view of the many possible embodiments to which the principles or invention may be applied, it should be recognized that the illustrated embodiment is only a preferred example of the invention and should not be taken as a limitation on the scope of the invention. Rather, the invention is defined by the following claims. We therefore claim as the invention all such embodiments that come within the scope of these claims.

We claim:

1. In a multiprocessor computer system having a shared memory distributed among multiple nodes, a method of accessing a memory location on one node that shares the same physical memory address as a memory location on another node, the method comprising:

providing a memory map for a single-node environment, the memory map uniquely identifying all physical memory addresses in the computer system by assigning unique representative physical memory addresses to memory locations that share a physical memory address and actual physical memory addresses to memory locations that do not share a physical memory address;

providing a memory map for a multinode environment in which an actual physical memory address is shared by memory locations on at least two nodes;

generating a memory access request with a representative physical memory address;

determining from the representative physical memory address which node the address corresponds to;

sending the memory access request to the indicated node; and at the indicated node, translating the representative physical memory address to an actual physical memory address in conformance with the memory map for the multinode environment, wherein the representative physical address has a first base portion and an index portion according to the memory map for the single-node environment and wherein the translating the representative physical memory address further includes replacing the first base portion with a second base portion according to the memory map for the multinode environment.

2. The method of claim 1 wherein the determining step includes using the representative physical address to access a database entry, the database entry including a field indicating a node that the representative physical address corresponds to.

3. The method of claim 1 wherein the request includes a first command in conformance with the single-node environment and, if the representative physical address falls within a predetermined range of addresses, translating the first command to a second command in conformance with the multinode environment.

4. The method of claim 3 wherein the predetermined range of addresses are associated with an input/output space for communicating with peripheral devices attached to the computer system.

5. The method of claim 1 wherein a node includes a local bus and a snoopy cache protocol engine coupled to the local bus and the receiving step includes monitoring the local bus using the snoopy cache protocol engine.

6. The method of claim 5 wherein the snoopy cache protocol engine accepts the request if the representative physical address is within an address range the snoopy cache protocol engine controls.

7. The method of claim 5 wherein a node further includes a memory and remote cache protocol engine coupled to the snoopy cache protocol engine.

8. The method of claim 1 wherein the memory map for the single-node environment includes a range of addresses that require translation and wherein addresses within the range are translated and addresses outside of the range are not translated.

9. In a multiprocessor computer system having a shared memory distributed among multiple nodes, a method of accessing a memory location on one node that shares the same physical memory address as a memory location on another node, the method comprising the following steps:

providing a node having a local bus, shared memory, a snoopy cache protocol engine and a remote cache protocol engine, providing a memory map for a single-node environment, the memory map uniquely identifying all physical memory addresses in the computer system by assigning unique representative physical memory addresses to memory locations that share a physical memory address and actual physical memory addresses to memory locations that do not share a physical memory address;

providing a memory map for a multinode environment in which an actual physical memory address is shared by memory locations on at least two nodes;

generating a memory access request with a representative physical memory address;

monitoring the local bus with the snoopy cache protocol engine that detects the request;

passing the request from the snoopy cache protocol engine to the memory and remote cache protocol engine;

ascertaining a node the representative physical address of the request corresponds to using the memory and remote cache protocol engine;

sending the request to the ascertained node; and at the indicated node, translating the representative physical memory address of the request to an actual physical memory address in conformance with the memory map for the multinode environment.

10. In a multiprocessor computer system having a shared memory distributed among multiple nodes, a method of accessing a memory location, the method comprising:

providing a first range of physical memory addresses that are unique to memory locations within the computer system and a second range of physical memory addresses that are shared by memory locations on two or more nodes;

in response to a request to access a memory location within the first range of addresses, using an address associated with a request as an actual address for the memory location;

in response to a request to access a memory location within the second range of addresses, using an address associated with the request as a representative physical memory address for the memory location, the representative physical memory address indicating the node in the computer system that contains the memory location;

for a request to access a memory location within a third range of addresses:

using an address associated with the request to ascertain a node in the computer system that contains the memory location; and translating the request to a format compatible with devices associated with the third range of addresses.

11. The method of claim 10 further including:

for the request within the second range of addresses, translating the representative physical address associated with the request to an actual address for the memory location.

12. The method of claim 10 wherein the third range of addresses are associated with an input/output space for communicating with peripheral devices attached to the computer system.

13. In a multiprocessor computer system having a shared memory distributed among multiple nodes, a method of accessing a memory location, the method comprising:

providing a first memory map for an environment where each memory address in the system is unique;

providing a second memory map for a multinode environment having at least two different memory locations with a same physical memory address;

receiving a request on a node for access to a memory location having a first memory address in conformance with the first memory map; and translating the first address to a second address in conformance with the second memory map for the multinode environment by replacing a first base portion of the first address with a second base portion.

14. In a multiprocessor computer system having shared memory distributed among multiple nodes, a method of running an operating system designed for an environment wherein every physical memory address is unique in an environment wherein every physical memory address is not unique, the method comprising:

providing a multinode environment wherein some memory locations on two or more nodes have shared physical memory addresses and other memory locations having unique physical memory addresses across each node;

providing a memory map in conformance with an environment that uniquely identifies all address spaces in the multinode environment, the memory map including a first range of addresses which represent unique address spaces in the multinode environment and a second range of addresses which represent memory locations on two or more nodes having shared physical memory addresses in the multinode environment;

for requests to access a memory location within the first range of addresses, using an address accompanying the request as a unique actual physical memory address; and for requests to access a memory location within the second range of addresses, translating a representative address accompanying the request to a shared actual physical memory by replacing a first base portion of the representative address with a second base portion.

* * * * *